(12) United States Patent
Socher et al.

(10) Patent No.: US 8,121,367 B2
(45) Date of Patent: Feb. 21, 2012

(54) METHOD AND SYSTEM FOR VESSEL SEGMENTATION IN FLUOROSCOPIC IMAGES

(75) Inventors: Richard Socher, Dresden (DE); Adrian Barbu, Tallahassee, FL (US); Bogdan Georgescu, Plainsboro, NJ (US); Wei Zhang, Plainsboro, NJ (US); Peter Durlak, Erlangen (DE); Stefan Böhm, Oberasbach (DE); Dorin Comaniciu, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 848 days.

(21) Appl. No.: 12/229,663

(22) Filed: Aug. 26, 2008

(65) Prior Publication Data
US 2009/0080728 A1    Mar. 26, 2009

Related U.S. Application Data

(60) Provisional application No. 60/974,087, filed on Sep. 21, 2007.

(51) Int. Cl.
*G06K 9/00* (2006.01)
(52) U.S. Cl. ........................................ 382/128
(58) Field of Classification Search .............. 382/128, 382/131
See application file for complete search history.

(56) References Cited

U.S. PATENT DOCUMENTS

| | | |
|---|---|---|
| 5,557,684 A | 9/1996 | Wang et al. |
| 6,826,292 B1 | 11/2004 | Tao et al. |
| 6,987,865 B1 | 1/2006 | Szeliski et al. |
| 7,155,032 B2 | 12/2006 | Szeliski et al. |
| 2006/0285747 A1 | 12/2006 | Blake et al. |
| 2007/0116332 A1 | 5/2007 | Cai et al. |
| 2007/0116356 A1 | 5/2007 | Gong et al. |
| 2008/0100621 A1 | 5/2008 | Aharon et al. |
| 2008/0101676 A1* | 5/2008 | Zheng et al. ............... 382/131 |
| 2008/0273777 A1* | 11/2008 | Luboz et al. ............... 382/130 |

OTHER PUBLICATIONS

Barbu, A., et al., "Hierarchical Learning of Curves Application to Guidewire Localization in Fluoroscopy", IEEE Int'l. Conf. Comp. Vision and Pattern Rec., 2007.
Freeman, W.T., et al., "The Design and Use of Steerable Filters", IEEE Transactions on Pattern Analysis and Machine Intelligence, 1991.
Tu, Z., "Probabilistic Boosting-Tree: Learning Discriminative Models for Classification, Recognition, and Clustering", IEEE Int'l Conf. Comp. Vision, 2006.

* cited by examiner

*Primary Examiner* — Clayton E Laballe
*Assistant Examiner* — Noam Reisner

(57) ABSTRACT

A method and system for vessel segmentation in fluoroscopic images is disclosed. Hierarchical learning-based detection is used to perform the vessel segmentation. A boundary classifier is trained and used to detect boundary pixels of a vessel in a fluoroscopic image. A cross-segment classifier is trained and used to detect cross-segments connecting the boundary pixels. A quadrilateral classifier is trained and used to detect quadrilaterals connecting the cross segments. Dynamic programming is then used to combine the quadrilaterals to generate a tubular structure representing the vessel.

25 Claims, 5 Drawing Sheets

METHOD AND SYSTEM FOR VESSEL SEGMENTATION IN FLUOROSCOPIC IMAGES

This application claims the benefit of U.S. Provisional Application No. 60/974,087, filed Sep. 21, 2007, the disclosure of which is herein incorporated by reference.

BACKGROUND OF THE INVENTION

The present invention relates to vessel segmentation in fluoroscopic images, and more particularly to learning-based hierarchical vessel segmentation in fluoroscopic images.

Coronary angiography is a minimally invasive medical procedure to restore blood flow through clogged coronary arteries. During this procedure, a catheter containing a guidewire is inserted through an artery in the thigh, and guided by a cardiologist through the arteries until it reaches the blocked coronary artery. The catheter is stopped immediately before the stenosis or blockage, and the guidewire is guided through the stenosis. A catheter with a deflated balloon is then inserted into the artery and guided along the guidewire until the balloon reaches the blockage. The balloon is then inflated and deflated repeatedly to unblock the artery, and a stent is placed at that position to prevent the artery from becoming blocked again.

The entire coronary angiography procedure is monitored with real-time fluoroscopic images. Fluoroscopic images are X-ray images taken over a period of time resulting in an image sequence. A contrast agent is injected into the artery in order to visualize the vessels (arteries) in the fluoroscopic images. This aids the cardiologist in the navigation of the catheter, guidewire, balloon, and stent in the vessels. During a coronary angiography procedure, the contrast agent is typically injected into the vessels several times. However, there are safety concerns involved with the repeated use of the contrast agent, such as an increase in the absorbed radiation rate in the tissue. Accordingly, it is desirable to reduce the amount of contrast agent used in the coronary angiography procedure.

BRIEF SUMMARY OF THE INVENTION

The present invention provides a method and system for vessel segmentation in fluoroscopic images. Such vessel segmentation can be used to segment the vessel surrounding the guidewire in a coronary angiography procedure. The segmentation of the vessel can be projected to later frames of the fluoroscopic image sequence in real time, in order to reduce the need for additional injections of contrast agent. Embodiments of the present invention utilize hierarchical learning-based detection to segment vessels in fluoroscopic images.

In one embodiment of the present invention, a fluoroscopic image is received. Boundary pixels of a vessel are detected in the fluoroscopic image using a trained boundary classifier. Cross-segments connecting the boundary pixels are then detected using a trained cross-segment classifier, and quadrilaterals connecting the cross-segments are detected using a trained quadrilateral classifier. The quadrilaterals are then combined to generate a tubular structure representing the vessel. The quadrilaterals can be combined using dynamic programming based on the cross-segments detected by the cross-segment classifier and the quadrilaterals detected by the quadrilateral classifier. The boundary classifier, cross-segment classifier, and quadrilateral classifier can be trained using a probabilistic boosting tree (PBT). The tubular structure representing the vessel can be projected from the fluoroscopic image to subsequent fluoroscopic images in a fluoroscopic image sequence.

These and other advantages of the invention will be apparent to those of ordinary skill in the art by reference to the following detailed description and the accompanying drawings.

DETAILED DESCRIPTION

The present invention is directed to a method and system for vessel segmentation in fluoroscopic images. Embodiments of the present invention are described herein to give a visual understanding of the vessel segmentation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Figure 1:
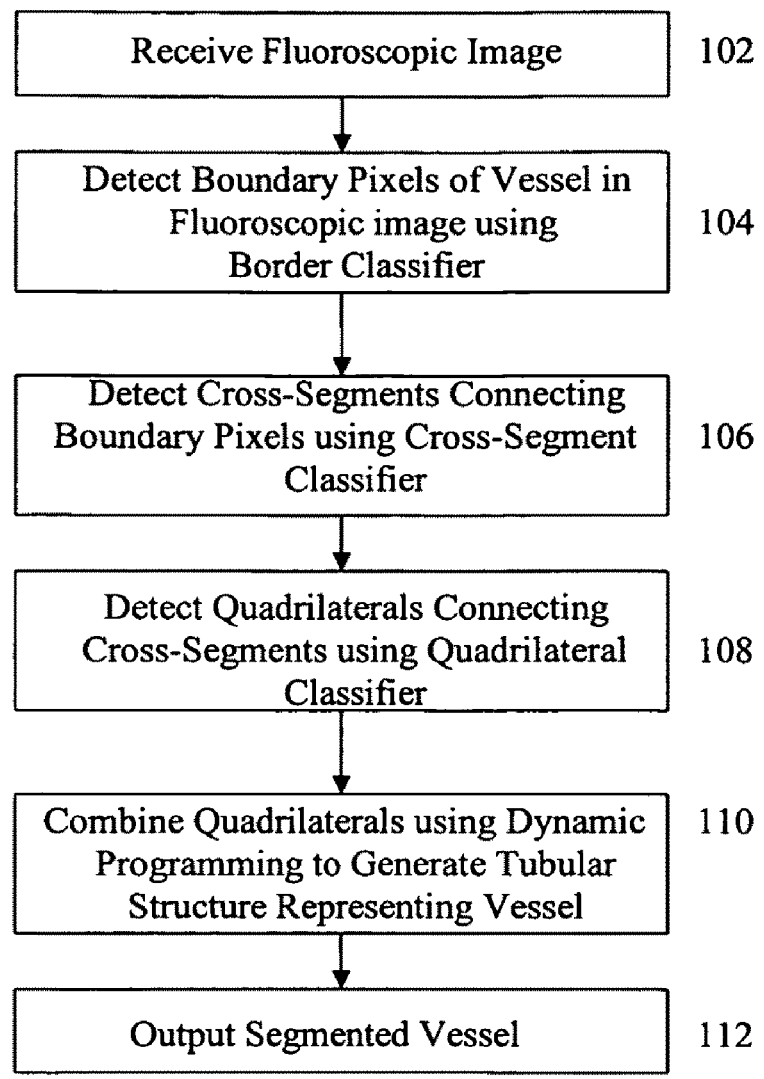
FIG. 1 illustrates a method for vessel segmentation in a fluoroscopic image according to an embodiment of the present invention.

FIG. 1 illustrates a method for vessel segmentation in a fluoroscopic image according to an embodiment of the present invention. The method of FIG. 1 can be used to segment a vessel during a coronary angiography procedure, but the present invention is not limited thereto, and can be used for vessel segmentation independent of any coronary angiography procedure. The method of FIG. 1 utilizes learning-based hierarchical structure based on the idea of marginal space learning. Marginal space learning is a learning technique, in which the dimensionality of the search space is gradually increased. The learning and searching computations are performed in a sequence of marginal spaces that are selected such that the marginal probabilities have small entropies. A classifier is trained at each marginal space learning level to detect candidates based on the search space at each level. In particular, the method of FIG. 1 detects the vessel in stages, by detecting a boundary of the vessel in a first level, then detecting cross-segments connecting boundary pixels in a second level, and detecting quadrilaterals connecting the cross-segments in a third level.

At step 102, a fluoroscopic image is received. The fluoroscopic image can be one of a sequence of fluoroscopic images. For example, the sequence of fluoroscopic images can be X-ray images taken in real time at a regular interval while monitoring a coronary angiography procedure. Each image in the sequence can be referred to as a frame. The fluoroscopic image can be a contrast enhanced image taken with a contrast agent injected in the vessel to be segmented. The fluoroscopic image can be received directly from an X-ray imaging device or can be loaded, for example from a memory or storage of a computer system, or some other computer readable medium.

At step 104, boundary pixels of the vessel are detected in the fluoroscopic image using a boundary classifier. The boundary classifier can be trained based on training data as a probabilistic boosting tree (PBT) using Haar features. The training data can be fluoroscopic images with annotated positive and negative border pixels. A PBT classifier is trained by recursively constructing a tree, where each of the nodes represents a strong classifier. Once the strong classifier of each node is trained, the input training data for the node is classified into two sets (positives and negatives) using the learned strong classifier. The two new sets are fed to left and right child nodes respectively to train the left and right child nodes. In this way, the PBT classifier will be constructed recursively.

Figure 2:
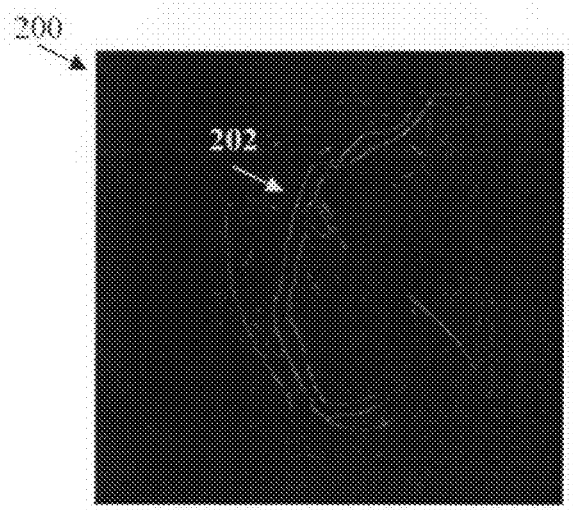
FIG. 2 illustrates exemplary boundary pixel detection results.

In order to detect the boundary pixels using the trained border classifier, a gradient descent based method can first be used to determine many locations in the fluoroscopic image as potential vessel boundary points. According to a possible implementation, when this method is being used in coronary angiography, information from a detected guidewire in previous frames of the fluoroscopic image sequence can be used to restrict the search space of the potential boundary points. The trained boundary classifier determines a probability for each potential boundary point, in order to classify the potential boundary points as positive (boundary pixels) or negative. The boundary points classified as positive by the boundary classifier are kept as the detected boundary pixels. FIG. 2 illustrates exemplary boundary pixel detection results. As illustrated in FIG. 2, image 200 is a fluoroscopic image showing a vessel boundary 202 detected using a trained boundary classifier. As shown in image 200, the boundary classifier may classify some points that are not part of the vessel as vessel boundary pixels.

Returning to FIG. 1, at step 106, cross-segments connecting the boundary pixels are detected using a cross-segment classifier. The cross-segment classifier can be trained based on training data as a PBT using Haar features. The cross-segment classifier searches pairs of boundary pixels that can be connected by a line in order to detect cross-segments that connect boundary pixels and are approximately perpendicular to the local direction of the vessel boundary at each of the boundary pixels connected. Two boundary pixels can be connected only if the gradient direction of the image at one of the boundary pixels directs a line toward the other boundary pixel. The trained cross-segment classifier determines a probability for each segment connecting a pair of boundary pixels to classify the segments as positive (in the vessel) or negative. The segments classified as positive by the trained cross-segment detector, including the boundary pixels connected by the segments, are kept as the detected cross-segments. Segments classified as negative and boundary pixels not connected by positively classified cross-segments are discarded. This prunes many detected boundary pixels that are not in the vessel.

Figure 3:
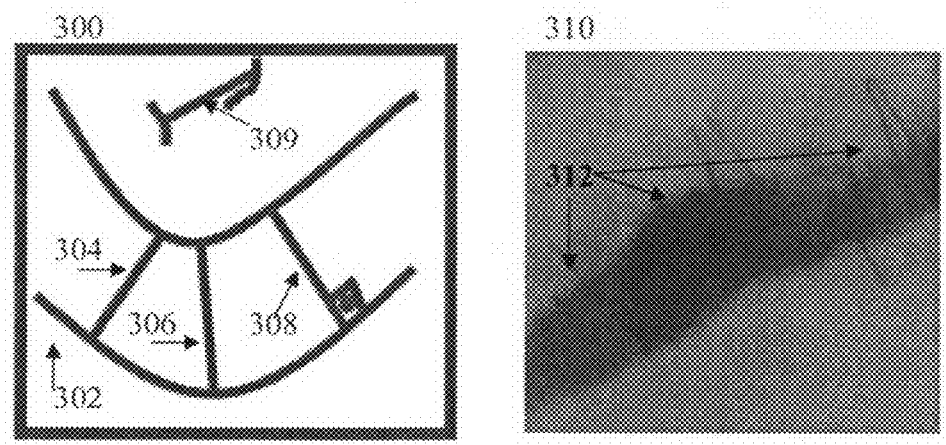
FIG. 3 illustrates exemplary cross-segment detection results.

FIG. 3 illustrates exemplary cross-segment detection results. As illustrated in FIG. 3, image 300 is a conceptual diagram showing a vessel 302 and cross-segments 304, 306, and 308 connecting boundary points of the vessel. As shown in image 300, the cross segments 304, 306, and 308 are approximately perpendicular to the local direction of the vessel boundary. Image 300 also shows a segment 309 that is outside of the vessel 302. Image 310 is a fluoroscopic image showing cross-segments 312 detected using a trained cross-segment classifier.

Returning to FIG. 1, at step 108, quadrilaterals connecting the cross-segments are detected in the fluoroscopic image using a trained quadrilateral classifier. The quadrilateral classifier can be trained based on training data as a PBT using steerable features. The trained quadrilateral searches pairs of cross-segments that can be connected using a quadrilateral to detect quadrilaterals that are likely to be within the vessel. Potential quadrilaterals are generated by connecting reasonable cross-segment pairs. A pair of cross-segments can be considered reasonable based on the proximity and angle of the cross-segments, and whether the cross-segments are on the correct side of each other. Two cross-segments are considered on the correct side of each other if they do not cross each other. The trained quadrilateral classifier determines a probability for each of the potential quadrilaterals in order to classify quadrilaterals as positive (within the vessel) or negative.

Figure 4:
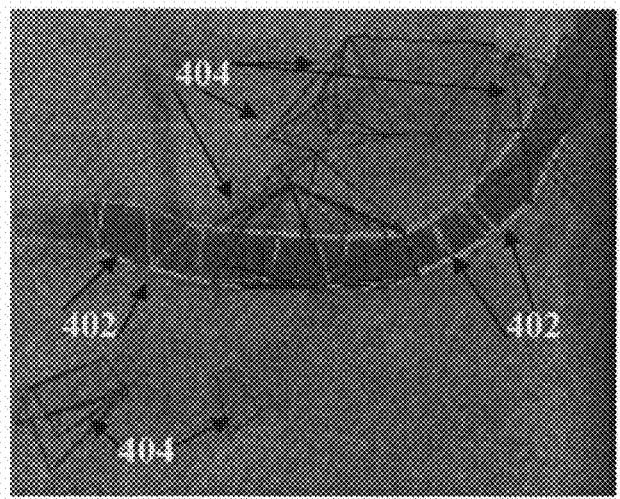
FIG. 4 illustrates exemplary quadrilateral detection results.

FIG. 4 illustrates exemplary quadrilateral detection results. As illustrated in FIG. 4, image 400 is a fluoroscopic image showing quadrilaterals 402 classified as positive by a trained quadrilateral classifier and quadrilaterals 404 classified as negative by the trained quadrilateral classifier. The positive quadrilaterals 402 have a high probability of being with the vessel and the negative quadrilaterals 404 have a low probability of being with the vessel.

Returning to FIG. 1, at step 110, the detected quadrilaterals are combined using dynamic programming to generate a tubular structure representing the vessel in the fluoroscopic image. Dynamic programming can be used to essentially determine a "best path" of the detected quadrilaterals to connect the optimal cross-segments. In order to use dynamic programming to combine the quadrilaterals, each detected cross-segment represents a node in a graph. The node costs are based on the probabilities determined by the cross-segment classifier. Transition costs between the nodes are based on the probabilities of the detected quadrilaterals connecting the cross-segments determined by the quadrilateral classifier. Based on these node costs and the transition costs, a path with a minimum cost is determined to combine the cross segments by connecting them with the quadrilaterals. The cross-segments and quadrilaterals of the minimum cost path form a tubular structure representing the vessel in the fluoroscopic image.

Figure 5:
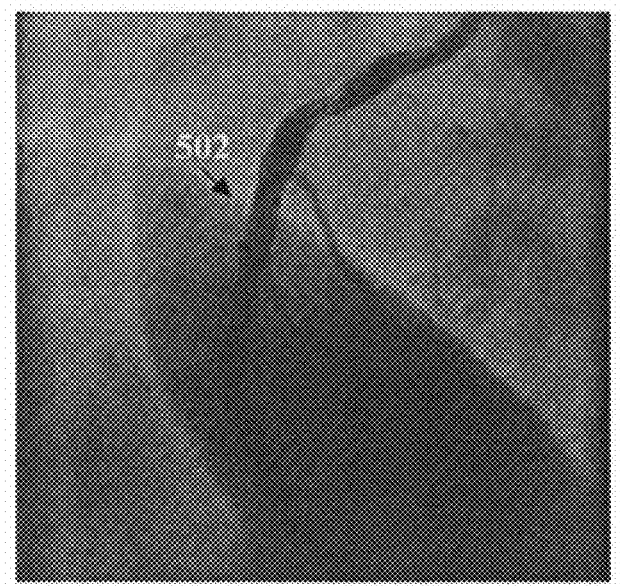
FIG. 5 illustrates exemplary results of combining detected quadrilaterals using dynamic programming.

FIG. 5 illustrates exemplary results of combining detected quadrilaterals using dynamic programming. As illustrated in FIG. 5, image 500 is a fluoroscopic image showing a tubular structure 502 resulting from combining detected quadrilaterals using dynamic programming. As shown in image 500, the tubular structure 502 is an accurate segmentation of the vessel in the fluoroscopic image 500.

Returning to FIG. 1, at step 112, the segmented vessel is output. For example, the segmented vessel (i.e., the tubular structure representing the vessel) can be displayed in the fluoroscopic image as an image on a display of a computer system, or stored in a memory or storage of a computer system. Furthermore, the segmented vessel can be used in real-time medical procedures. In the case of a coronary angiography procedure, the segmented vessel can be projected to future frames of a real-time fluoroscopic image sequence used to monitor the procedure. This can reduce need for future contrast agent injections, thus significantly reducing the overall amount of contrast agent injected into a patient during a coronary angiography procedure.

Figure 6:
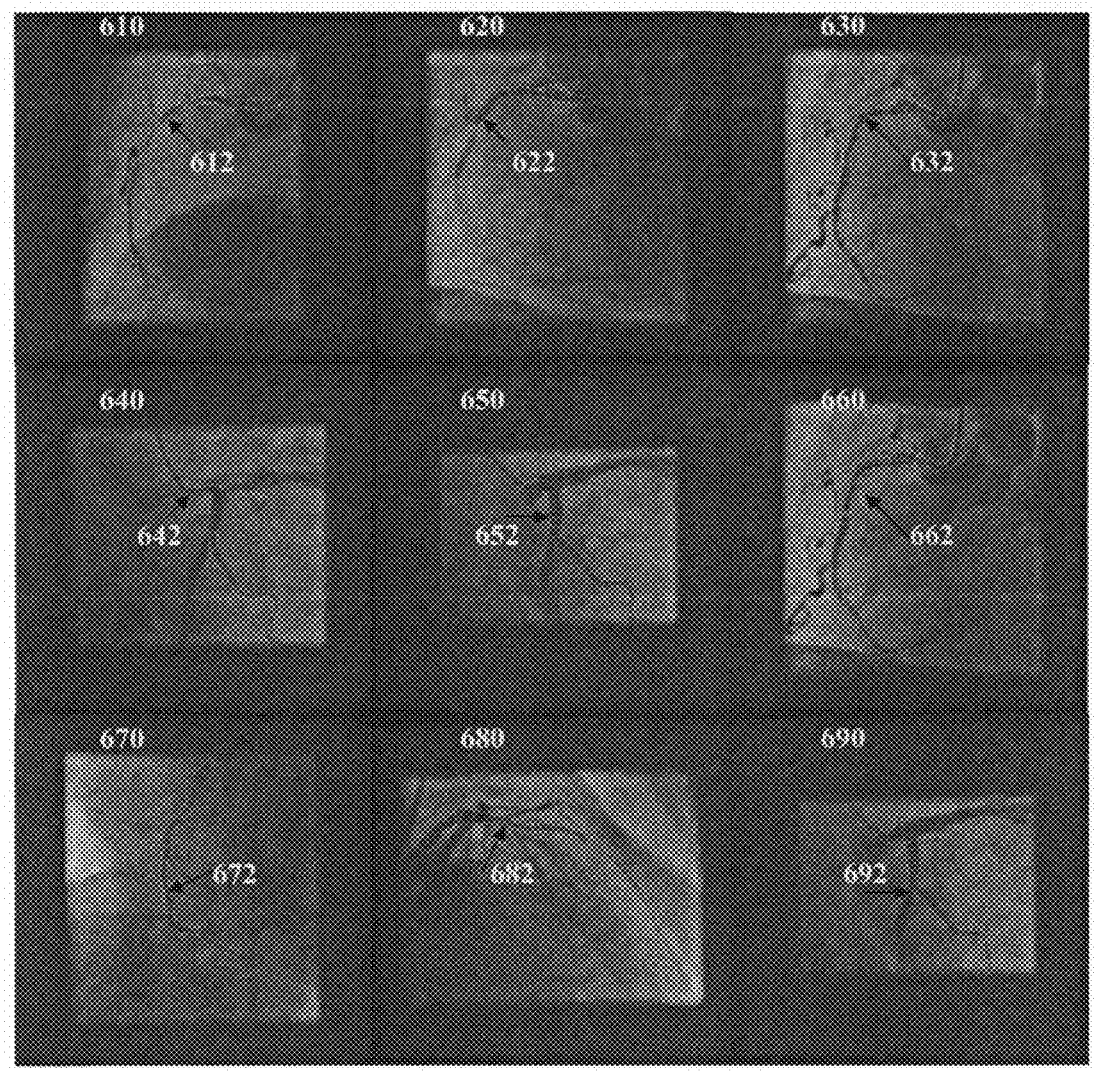
FIG. 6 illustrates exemplary vessel segmentation results using the method of FIG. 1.

FIG. 6 illustrates exemplary vessel segmentation results using the method of FIG. 1. As illustrated in FIG. 6, images 610, 620, 630, 640, 650, 660, 670, 680, and 690 are fluoroscopic images that show segmented vessels 612, 622, 632, 642, 652, 662, 672, 682, and 692, respectively.

Figure 7:
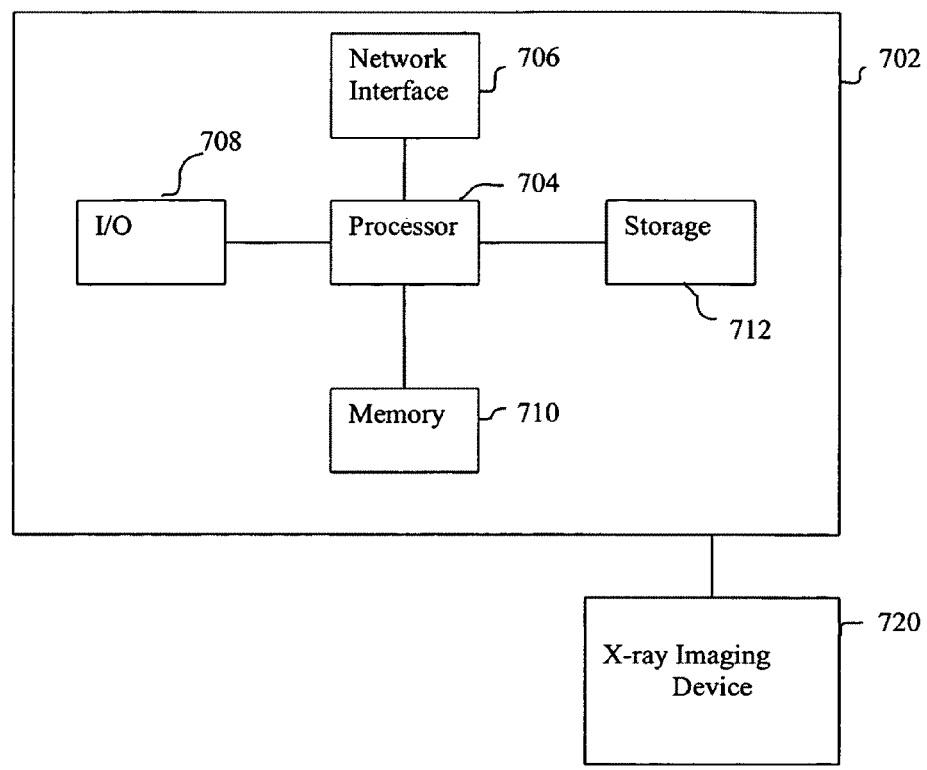
FIG. 7 is a high level block diagram of a computer capable of implementing the present invention.

The above-described methods for vessel segmentation can be implemented on a computer using well-known computer processors, memory units, storage devices, computer software, and other components. A high level block diagram of such a computer is illustrated in FIG. 7. Computer 702 contains a processor 704 which controls the overall operation of the computer 702 by executing computer program instructions which define such operation. The computer program instructions may be stored in a storage device 712, or other computer readable medium (e.g., magnetic disk, CD ROM, etc.), and loaded into memory 710 when execution of the computer program instructions is desired. Thus, the method steps of FIG. 1 can be defined by the computer program instructions stored in the memory 710 and/or storage 712 and controlled by the processor 704 executing the computer program instructions. An X-ray imaging device 720 can be connected to the computer 702 to input X-ray radiographs to the computer 702. It is possible to implement the X-ray imaging device 720 and the computer 702 as one device. It is also possible that the X-ray imaging device 720 and the computer 702 communicate wirelessly through a network. The computer 702 also includes one or more network interfaces 706 for communicating with other devices via a network. The computer 702 also includes input/output devices 708 that enable user interaction with the computer 702 (e.g., display, keyboard, mouse, speakers, buttons, etc.) One skilled in the art will recognize that an implementation of an actual computer could contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for vessel segmentation in a fluoroscopic image, comprising:
   detecting boundary pixels of a vessel in the fluoroscopic image using a trained boundary classifier;
   detecting cross-segments connecting said boundary pixels using a trained cross-segment classifier;
   detecting quadrilaterals connecting said cross-segments using a trained quadrilateral classifier; and
   combining said quadrilaterals to generate a tubular structure representing the vessel.

2. The method of claim 1, wherein the boundary classifier, the cross-segment classifier, and the quadrilateral classifier are each trained using a probabilistic boosting tree (PBT).

3. The method of claim 1, wherein said step of detecting boundary pixels comprises:
   determining potential boundary pixels in the fluoroscopic image using gradient descent; and
   classifying each of the potential boundary pixels as positive or negative by determining a probability that each potential boundary pixel is on a boundary of the vessel, using the boundary classifier.

4. The method of claim 3, wherein the fluoroscopic image is one of a sequence of fluoroscopic images and said step of detecting boundary pixels further comprises:
   restricting a search space of the potential boundary pixels for the boundary classifier based on a location of a detected guidewire in at least one prior fluoroscopic image in the sequence of fluoroscopic images.

5. The method of claim 1, wherein said step of detecting cross-segments comprises:
   generating potential segments by connecting pairs of boundary pixels; and
   classifying each of the potential segments as positive or negative by determining a probability that each potential segment is in the vessel, using the cross-segment classifier.

6. The method of claim 1, wherein said step of detecting quadrilaterals comprises:
   generating potential quadrilaterals by connecting pairs of cross-segments; and
   classifying each of the potential quadrilaterals as positive or negative by determining a probability that each potential quadrilateral is in the vessel, using the quadrilateral classifier.

7. The method of claim 1, wherein said step of combining said quadrilaterals to generate a tubular structure representing the vessel, comprises:
   combining said quadrilaterals using dynamic programming based on said quadrilaterals and said cross-segments.

8. The method of claim 7, wherein each of said cross-segments represents a node in a graph, node costs are based on cross-segment probabilities determined by said cross-segment classifier, transition costs between nodes are based on quadrilateral probabilities determined by said quadrilateral classifier, said step of combining said quadrilaterals using dynamic programming based on said quadrilaterals and said cross-segments comprises:
   determining a best path connecting the cross-segments based on the node costs and the transition costs.

9. The method of claim 1, further comprising:
   outputting the tubular structure representing the vessel.

10. The method of claim 1, wherein the fluoroscopic image is one of a sequence of fluoroscopic images, and further comprising:
    projecting the tubular structure representing the vessel to subsequent fluoroscopic images in the sequence of fluoroscopic images.

11. An apparatus for vessel segmentation in a fluoroscopic image, comprising:
    means for detecting boundary pixels of a vessel in the fluoroscopic image using a trained boundary classifier;
    means for detecting cross-segments connecting said boundary pixels using a trained cross-segment classifier;
    means for detecting quadrilaterals connecting said cross-segments using a trained quadrilateral classifier; and
    means for combining said quadrilaterals to generate a tubular structure representing the vessel.

12. The apparatus of claim 11, further comprising:
    means for training the boundary classifier, the cross-segment classifier, and the quadrilateral classifier using a probabilistic boosting tree (PBT).

13. The apparatus of claim 11, wherein said means for detecting boundary pixels comprises:

means for determining potential boundary pixels in the fluoroscopic image using gradient descent; and means for classifying each of the potential boundary pixels as positive or negative by determining a probability that each potential boundary pixel is on a boundary of the vessel, using the boundary classifier.

14. The apparatus of claim 11, wherein said means for detecting cross-segments comprises:

means for generating potential segments by connecting pairs of boundary pixels; and means for classifying each of the potential segments as positive or negative by determining a probability that each potential segment is in the vessel, using the cross-segment classifier.

15. The apparatus of claim 11, wherein said means for detecting quadrilaterals comprises:

means for generating potential quadrilaterals by connecting pairs of cross-segments; and means for classifying each of the potential quadrilaterals as positive or negative by determining a probability that each potential quadrilateral is in the vessel, using the quadrilateral classifier.

16. The apparatus of claim 11, wherein said means for combining said quadrilaterals to generate a tubular structure representing the vessel, comprises:

means for combining said quadrilaterals using dynamic programming based on said quadrilaterals and said cross-segments.

17. The apparatus of claim 11, wherein the fluoroscopic image is one of a sequence of fluoroscopic images, and further comprising:

means for projecting the tubular structure representing the vessel to subsequent fluoroscopic images in the sequence of fluoroscopic images.

18. A non-transitory computer readable medium encoded with computer executable instructions for vessel segmentation in a fluoroscopic image, the computer executable instructions defining steps comprising:

detecting boundary pixels of a vessel in the fluoroscopic image using a trained boundary classifier;

detecting cross-segments connecting said boundary pixels using a trained cross-segment classifier;

detecting quadrilaterals connecting said cross-segments using a trained quadrilateral classifier; and combining said quadrilaterals to generate a tubular structure representing the vessel.

19. The non-transitory computer readable medium of claim 18, wherein the boundary classifier, the cross-segment classifier, and the quadrilateral classifier are each trained using a probabilistic boosting tree (PBT).

20. The non-transitory computer readable medium of claim 18, wherein the computer executable instructions defining the step of detecting boundary pixels comprise computer executable instructions defining the steps of:

determining potential boundary pixels in the fluoroscopic image using gradient descent; and classifying each of the potential boundary pixels as positive or negative by determining a probability that each potential boundary pixel is on a boundary of the vessel, using the boundary classifier.

21. The non-transitory computer readable medium of claim 18, wherein the computer executable instructions defining the step of detecting cross-segments comprise computer executable instructions defining the steps of:

generating potential segments by connecting pairs of boundary pixels; and classifying each of the potential segments as positive or negative by determining a probability that each potential segment is in the vessel, using the cross-segment classifier.

22. The non-transitory computer readable medium of claim 18, wherein the computer executable instructions defining the step of detecting quadrilaterals comprise computer executable instructions defining the steps of:

generating potential quadrilaterals by connecting pairs of cross-segments; and classifying each of the potential quadrilaterals as positive or negative by determining a probability that each potential quadrilateral is in the vessel, using the quadrilateral classifier.

23. The non-transitory computer readable medium of claim 18, wherein the computer executable instructions defining the step of combining said quadrilaterals to generate a tubular structure representing the vessel comprise computer executable instructions defining the step of:

combining said quadrilaterals using dynamic programming based on said quadrilaterals and said cross-segments.

24. The non-transitory computer readable medium of claim 23, wherein each of said cross-segments represents a node in a graph, node costs are based on cross-segment probabilities determined by said cross-segment classifier, transition costs between nodes are based on quadrilateral probabilities determined by said quadrilateral classifier, the computer executable instructions defining the step of combining said quadrilaterals using dynamic programming based on said quadrilaterals and said cross-segments comprise computer executable instructions defining the step of:

determining a best path connecting the cross-segments based on the node costs and the transition costs.

25. The non-transitory computer readable medium of claim 18, wherein the fluoroscopic image is one of a sequence of fluoroscopic images, and further comprising computer executable instructions defining the step of:

projecting the tubular structure representing the vessel to subsequent fluoroscopic images in the sequence of fluoroscopic images.

* * * * *